United States Patent [19]

Heiland

[11] Patent Number: 4,478,328

[45] Date of Patent: Oct. 23, 1984

[54] AUTOMATIC HIDE PROCESSING APPARATUS

[75] Inventor: Wolfgang K. Heiland, Trevose, Pa.

[73] Assignee: The United States of America as represented by the Secretary of Agriculture, Washington, D.C.

[21] Appl. No.: 333,945

[22] Filed: Dec. 23, 1981

[51] Int. Cl.³ .............................................. B65G 37/00
[52] U.S. Cl. ..................................... 198/479; 68/158; 198/652; 198/477; 69/32
[58] Field of Search ............... 198/477, 479, 695, 678, 198/651, 478, 482, 652, 797, 802; 271/205, 175; 68/158; 69/32, 33; 226/119

[56] References Cited

U.S. PATENT DOCUMENTS 1,258,001  3/1918  Hammersmith ..................... 271/205
4,161,269  7/1979  Kirkpatrick .......................... 271/204

Primary Examiner—Robert J. Spar
Assistant Examiner—Dennis Williamson
Attorney, Agent, or Firm—M. Howard Silverstein; William E. Scott; David G. McConnell

[57] ABSTRACT

An apparatus for loading cattlehides and like materials automatically onto carrier bars.

3 Claims, 8 Drawing Figures

FIG. 3

AUTOMATIC HIDE PROCESSING APPARATUS

BACKGROUND OF THE INVENTION

1. Field of the Invention

This invention relates to an apparatus for automatically loading cattlehides or other materials onto carrier bars for further treatment.

2. Description of the Art

Although carrier bars are used in the processing of cattlehides and other materials, the hides are loaded in the bars manually. The most relevant art known is that described in The German Scientific Journal Das Leder 28, 81-89, 1977, and in an abstract of the Das Leder article in JALCA 74, 140, 1979. However, in the apparatus and method described therein the hides are loaded manually onto the carrier bars.

SUMMARY OF THE INVENTION

An object of this invention is to provide an apparatus for loading cattlehides automatically onto carrier bars.

Another object is to provide an apparatus which loads cattlehides onto carrier bars automatically in such a manner that the approximate center of the lengthwise dimension of the hide is resting on the bar.

A further object is to provide an apparatus which has automatic clamping devices for preventing a hide from sliding off the carrier bar.

A still further object is to provide an apparatus for processing cattlehides and other materials automatically.

According to this invention the above objects are accomplished by an apparatus comprised of a feed conveyor mechanism provided with means for traverse movement and for raising and lowering at least one end of the mechanism, multiple hide carrier and clamping mechanisms, each of which has a carrier bar for holding a hide as it is transported through a processing operation and each of which has a pair of toggle lock clamps, and a process conveyor mechanism provided with means for transporting the hide carrier and clamping mechanisms through the processing operations and with means for actuating the toggle lock clamps and for preventing a hide from sliding off a carrier bar.

BRIEF DESCRIPTION OF THE DRAWINGS

FIG. 3 is a side elevation of part of the apparatus showing a hide clamped to a carrier bar.

DESCRIPTION OF THE INVENTION

Figure 1:
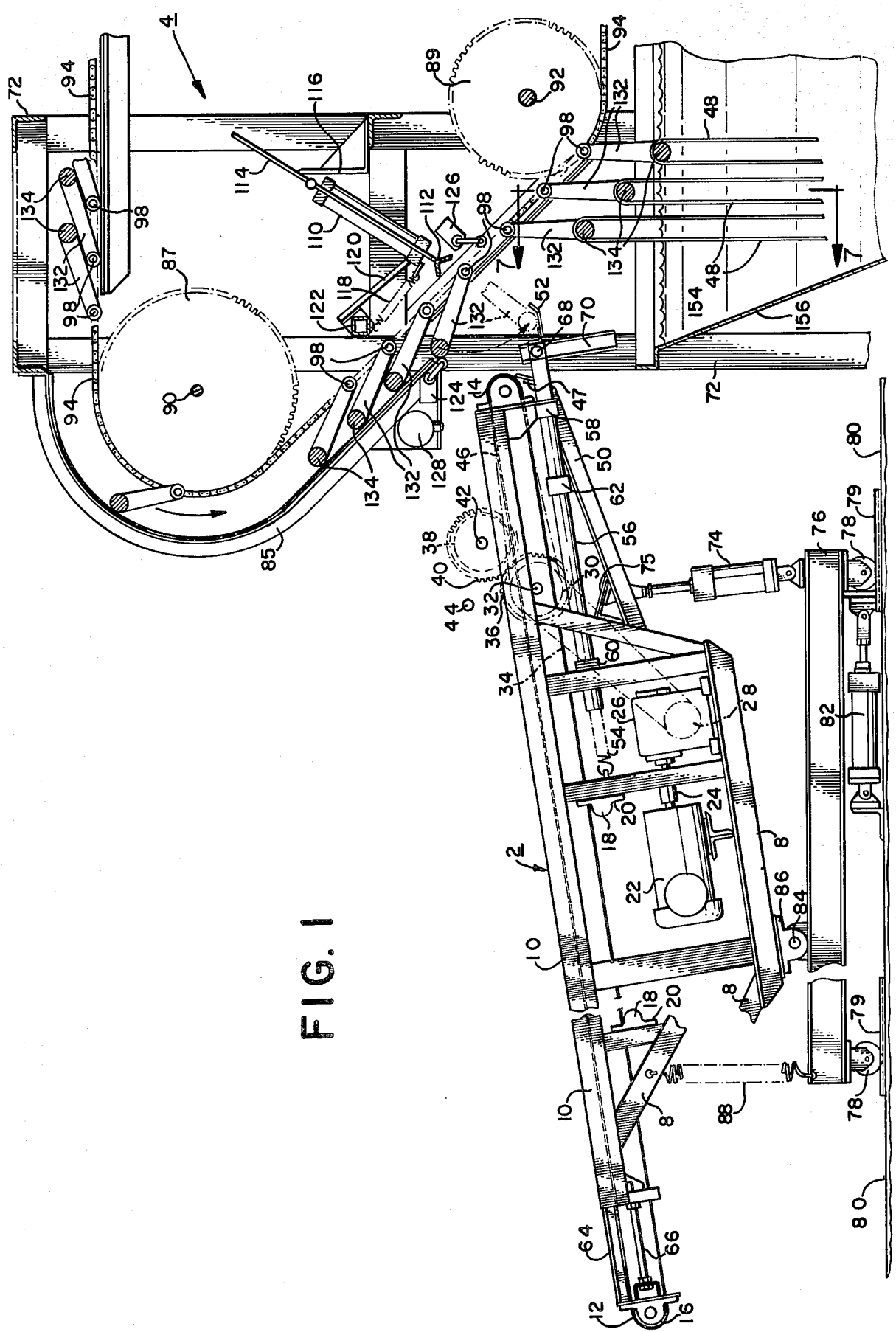
FIG. 1 is a side elevation of the apparatus with feed conveyor mechanism in position to have a hide placed on the conveyor belt.

The apparatus of this invention is comprised essentially of a feed conveyor mechanism 2, a process conveyor mechanism 4, and a hide clamping mechanism 6.

Feed conveyor mechanism 2 is comprised of a welded frame 8, a slider bed 10, a belt 12, a crowned drive roller 14, a crowned take-up roller 16, idler rollers 18 for supporting belt 12 and, bearing or pillow blocks 20 for supporting rollers 14 and 16 and idler rolls 18. Drive motor 22 is connected through coupling 24 to gear reducer 26 which drives sprocket 28. Sprocket 28 is connected to and drives sprocket 30 on jack shaft 32 through timing belt 34. Sprocket 30 is provided with spur gears 36 which drive dewatering roll 38 on shaft 42 through spur gears 40. Water spray 44 is located just ahead of roll 38. Crowned drive roller 14 is driven by sprocket 30 through timing belt 46. Doctor blade 47 is in contact with the face of drive roller 14 and assures a free discharge of the leading edge of a hide 48 when it reaches that point on feed conveyor belt 12. Doctor blade 47 is supported by weldment 50 which consists of three structural angles, one to provide a mounting surface for blade 47 and two to bolt weldment 50 to welded frame 8. Mechanism 2 is also provided with a catch hook 52 on each side of the mechanism, each of which is connected to an extension spring 54 located inside a catch hook guide tube 56 and supported by a front bearing 58 and a rear bearing 60. Crossarm 62 connects the two guide tubes 56 and prevents rotation of catch hooks 52. Extension springs 54 provide for a smooth, clatter-free operation and allow feed conveyor mechanism 2 to move forward and rearward without moving hooks 52 in the same direction. A take-up unit 64 on each side of the mechanism is individually adjustable through a threaded rod 66. Take-up units 64 provide means for tracking conveyor belt 12. Catch hooks 52 are provided with cam followers 68 which move within the confines of cam follower guides 70 and allow hooks 52 to move upward and downward in a generally vertical direction. Guides 70 are immovably attached to frame 72 of process conveyor mechanism 4. Feed conveyor mechanism 2 is pivotally mounted on carriage 76 by means of pivot shaft 84 and two bearings 86 and is provided with cylinder 74 for raising and lowering the forward or discharge end of mechanism 2. Cylinder 74 is attached to crossarm 75 and connects the forward end of conveyor 2 to carriage 76 which has four casters or wheels 78 each of which rolls in an individual guide channel 79 attached to platform 80. Traverse motion of the feed conveyor mechanism 2 is provided by clevis-mounted cylinder 82 between platform 80 and carriage 76. In order that the raising and lowering or pivoting action of mechanism 2 occurs smoothly, mechanism 2 is counterbalanced by an extension spring 88 on each side of mechanism 2 connected to feed conveyor frame 8 and carriage 76.

Figure 7:
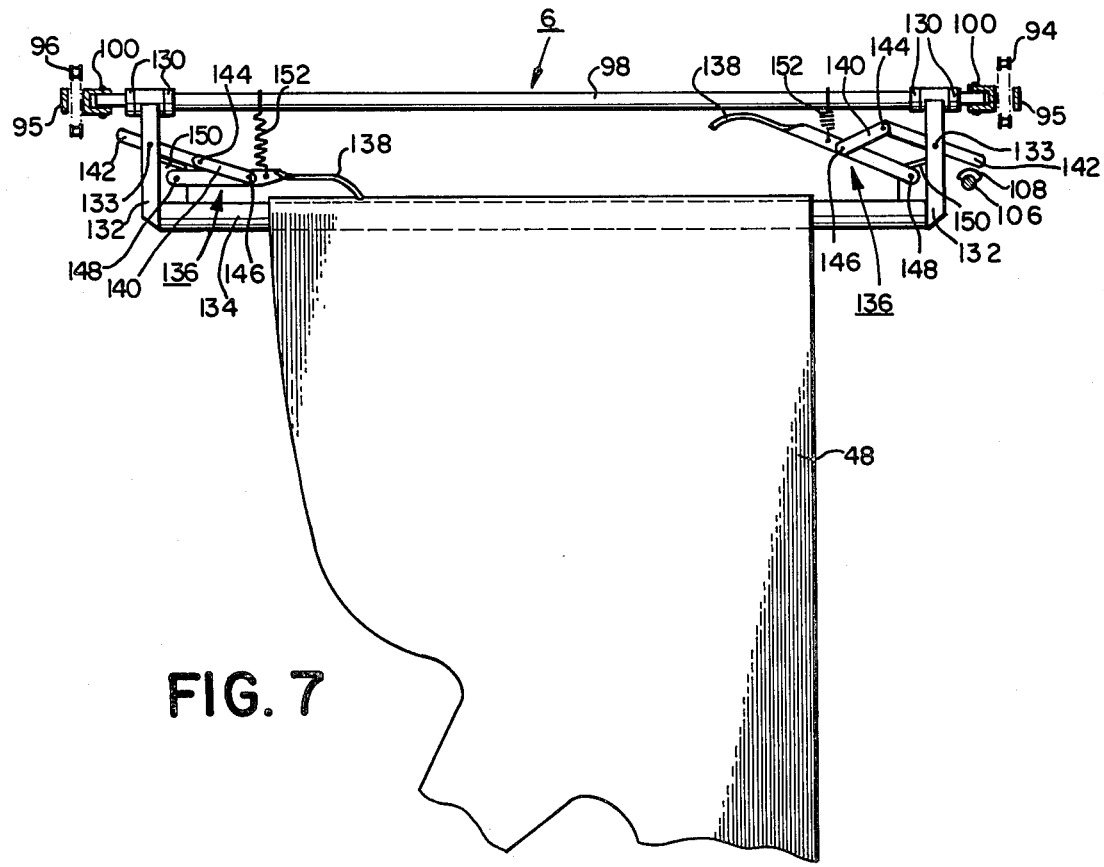
FIG. 7 is a partial section along line 7—7 of FIG. 1.

Hide carrier and clamping mechanism 6 is comprised of rod 98 pivotally attached to a linked chain 94 and chain 96 by means of pins 100, collars 130, an end arm 132 at each end, hide carrier bar 134, and two toggle lock clamps 136. Clamp 136 is shown in locked position at the left side of FIG. 7 and in open position at the right side of the figure. Each clamp 136 consists of clamp arm 138, connecting link 140 and actuating link 142. Actuating link 142 is attached to arm 132 at pivot 133 and to link 140 at pivot 144. Link 140 is attached to clamp arm 138 at pivot 146 and clamp arm 138 is attached to mechanism 6 at pivot 148 which is attached to end arm 132. When toggle lock clamps 136 are caused to close to locked position, stop 150 attached to end arm 132 prevents actuating link 142 and pivot 144 from pivoting any further downward than the position shown on the left side of FIG. 7. Spring 152 keeps clamp 136 elevated when it is in open position.

Figure 8:
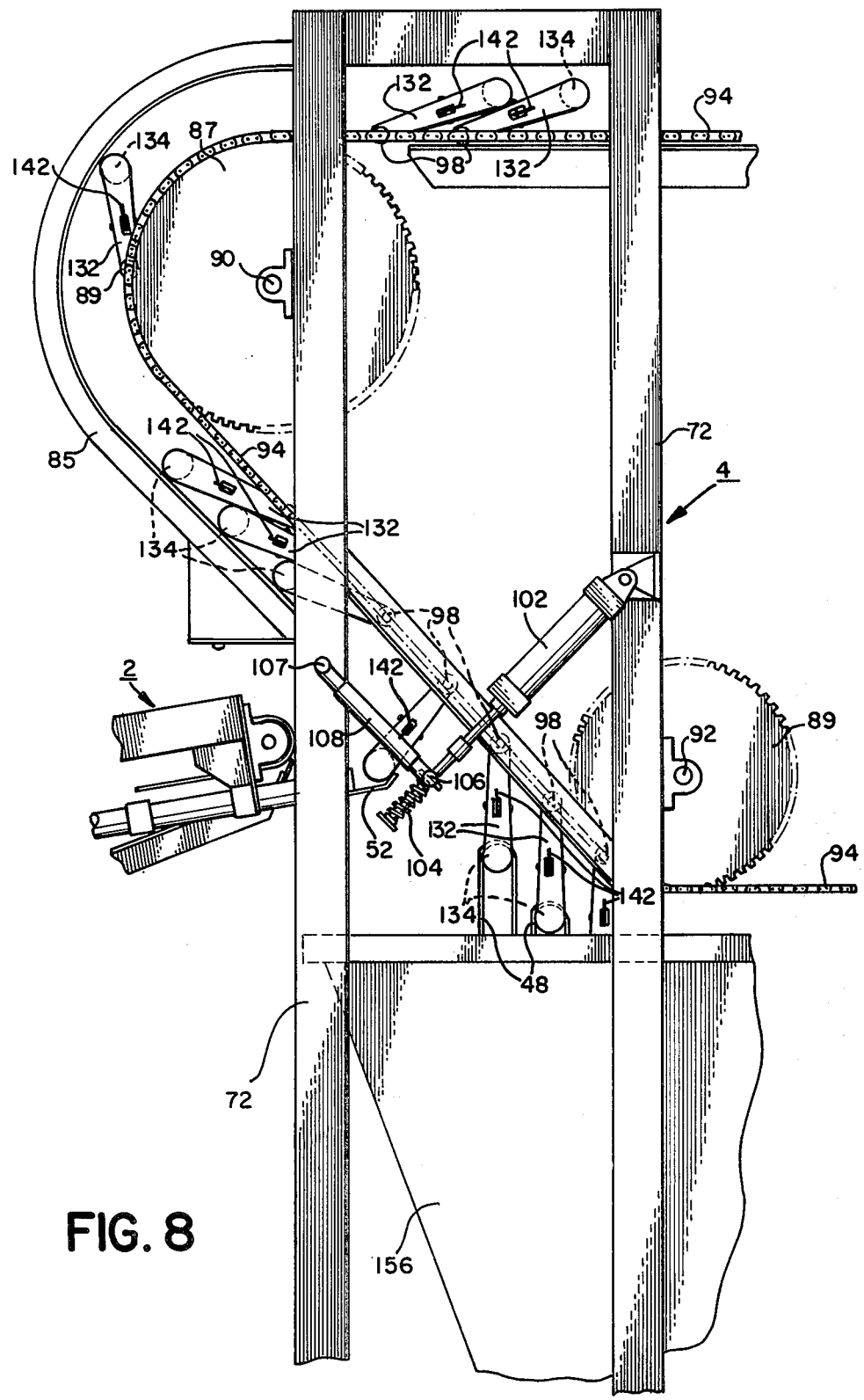
FIG. 8 is a side view showing a cylinder for actuating a toggle lock clamp. This figure shows the orientation of this actuating means with the rest of the apparatus shown in the other figures. This view was omitted from the other figures for the sake of clarity.

Process conveyor mechanism 4 is comprised of frame 72, hide carrier bar guide 85, a first sprocket 87 on each side of mechanism 4, a second sprocket 89 on each side of mechanism 4, shaft 90 for sprockets 87, shaft 92 for sprockets 89, two pintle chains 94 (FIGS. 1 and 7) and 96 (FIG. 7), and a chain guide 97 for each of 94 and 96. Each link of chains 94 and 96 has an outer link 95. The total mechanism includes other sets of sprockets so that each pintle chain 94 and 96 is a continuous chain. Since these are conventional and not part of the inventive concept they are not shown in the figures. Chain links 94 and 96 are also attachment links for pivotally attaching hide carrier and clamping mechanism 6 to mechanism 4. A rod 98 of each mechanism 6 is pivotally attached to a link of chains 94 and 96 by means of pins 100. Cylinders 102 and 103, FIG. 8, one on each side of mechanism 4 are provided to actuate toggle lock clamps 136 of mechanism 6 into locked position. Locking or closing of clamps 136 occurs at the midpoint of the hide loading cycle, that is, at that point in the operation when about one-half of the hide has been draped on hide carrier mechanism 6. Cylinder 102 has been omitted from the other figures for the sake of clarity. However, its location and orientation with respect to the parts of the apparatus shown in the other figures is easily seen in FIG. 8. When cylinder 102 is actuated it closes against the resistance of compression spring 104 thereby raising arm 106 and pivoting arm 108 at pivot point 107 on frame 72 causing arm 108 to contact actuating link 142 of mechanism 6 with enough force to close clamp 136. After 108 contacts 142 and closes clamp 136, cylinder 102 completes its closing cycle before opening to put arms 106 and 108 in position to actuate clamp 136 on the next succeeding mechanism 6 transported into hide loading position by mechanism 4. Mechanism 4 is also provided with single acting spring return clamping air cylinder 110 with clamping angle 112 for extra clamping action to overcome the inertia of a wet hide as it is transferred from feed conveyor mechanism 2 to hide clamping mechanism 6. Cylinder 110 is shown in clamping position in FIG. 3. A guide rod 114 on each side of cylinder 110 keeps clamping angle 112 aligned with hide carrier bars 134 of mechanism 6. Cylinder 110 is pivotally mounted on crossbar 116 and attached through spring 118 and bar 120 to crossbar 122. Mechanism 4 also has a first and second limit switch 124 and 126 respectively and photoelectric unit 128, the functions of which will be explained hereafter.

Hides or any other substance or material that is folded over a bar or other suitable equivalent for subsequent processing such as dyeing, soaking, drying, sizing or that is continuously processed in vats, ovens or chambers of various sorts can be easily processed on the apparatus of this invention. Use of the apparatus will be described with reference to the processing of cattlehides. It will also be described with reference to the electrical schematic shown in FIG. 5 and the pneumatic diagram shown in FIG. 6.

Figure 3:
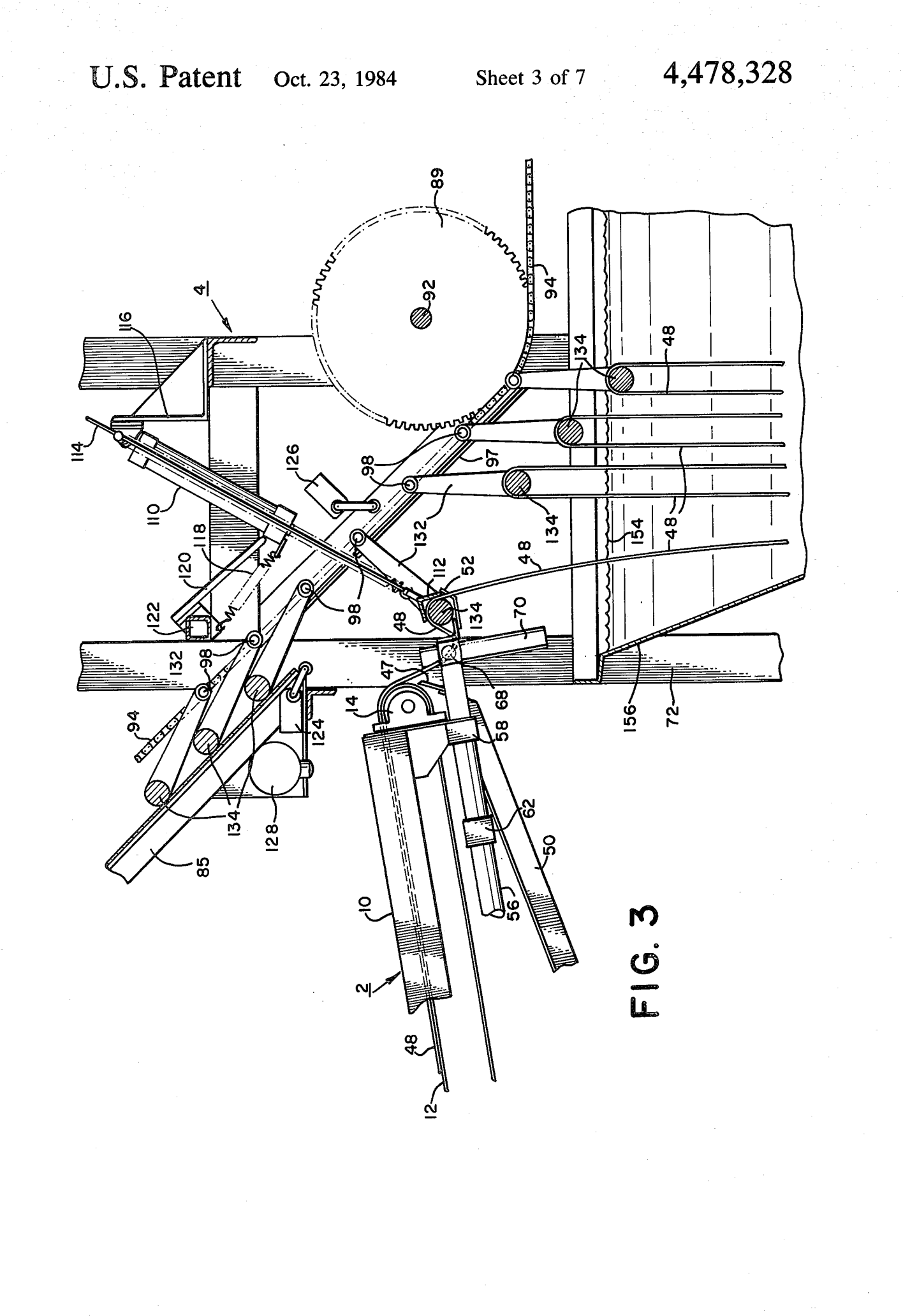
Figure 4:
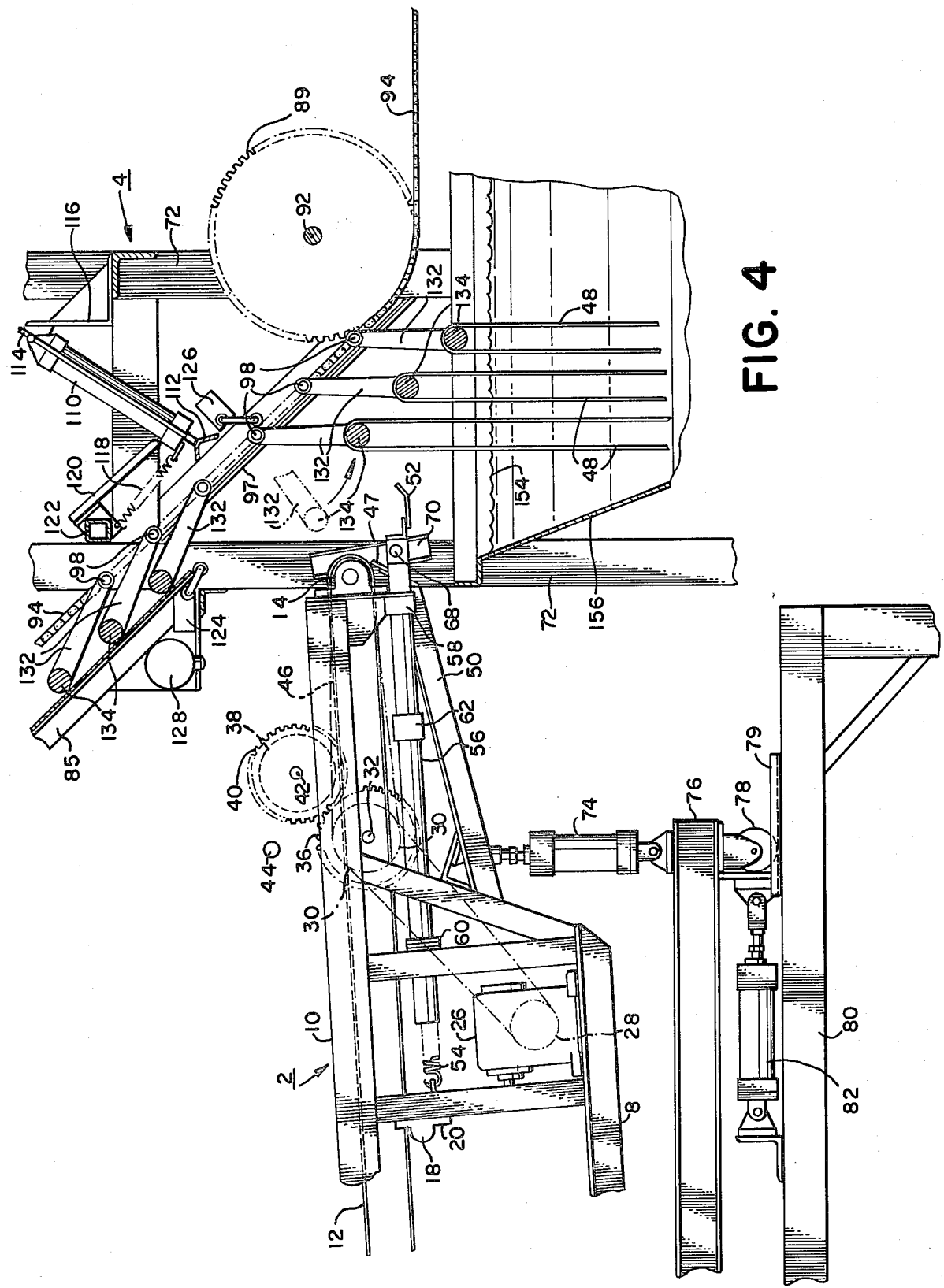
FIG. 4 is a side elevation showing feed conveyor mechanism in position after a hide has been loaded onto a carrier bar.

Feed conveyor mechanism 2 is shown in initial operating position in FIG. 1, that is, belt 12 is not moving and a cattlehide has been placed on it. Powered through switch 1, SW1, FIG. 5, in the on position mechanism 5 has been tilted up through the normally closed contacts of relay 3, R3, solenoid 3, SOL3, and air cylinder 74, FIG. 6. Catch hooks 52 are in position to intercept a hide carrier bar 134 when it drops off hide carrier bar guide 85 as chains 94 and 96 of mechanism 4 move slowly at a constant speed. As a bar 134 drops off guide 85 onto catch hooks 52 the normally open contacts of limit switch 124 are momentarily closed and one automatic loading cycle is initiated. The momentary closing of the contacts of 124 energizes and closes the normally open contacts of relay 1, R1, thereby energizing conveyor drive motor relay, M1, and solenoid 1, SOL1, which causes drive motor 22 to start running and water spray 44 to operate. At the same time that motor 22 starts running solenoid 2, SOL2, is energized and activates cylinder 82 which moves feed conveyor mechanism 2 forward to the position shown in FIG. 2. At this point, the leading portion of a hide 48 is run-in over bar 134 and is submerged in solution 154 in vat 156. Just prior to being run-in over bar 134, the leading edge of hide 48 is detected by photoelectric unit 128 thereby starting timer 2, T2, by energizing its clutch. After a preset time interval which at the constant speed of belt 12 equals half the length of hide 48, T2 times out and relay 2, R2, is energized. As R2 is energized the opening of its normally closed contacts deenergize SOL2 which changes state thereby causing feed conveyor mechanism 2 to traverse back to its starting position as shown in FIG. 1. At the same time solenoid 4, SOL 4, changes state as it is energized through relay 4, R4, and activates cylinders 102, 103 and 110 which in turn actuate toggle lock clamps 136 into locked position and clamping angle 112 into hide clamping position as shown in FIG. 3, thereby arresting the movement of hide 48 over hide carrier bar 134. As mechanism 2 traverses back to its starting position a gap is opened between drive roller 14 and bar 134 and as belt 12 continues running the remaining half of hide 48 falls free into vat 156. When hide 48 falls free it is draped in about equal lengths on each side of bar 134. At this point T3 times out and cylinders 102, 103 and 110 retract. Retraction of 102 and 103 does not actuate clamps 136 into unlocked position; they are released at a later stage of the hide processing. Shortly after T3 times out, T1 times out, R3 becomes energized and its normally closed contacts are opened thereby deenergizing SOL3 and causing cylinder 74 to close and lower mechanism 2. As mechanism 2 is lowered, catch hooks 52 are also lowered and release bar 134 as shown in FIG. 4. Rod 98 of free swinging bar 134 momentarily opens the normally closed contacts of limit switch 126 deenergizing R1. Motor 22 and belt 12 stop operating and T1 and T3 reset as power is removed from their clutches. As T1 resets, R3 becomes deenergized by closing its normally closed contacts and SOL3 is energized causing cylinder 74 to open and raise mechanism 2. Prior to this, as the end of hide 48 passed under photoelectric unit 128, T2 was reset. As mechanism 2 is in the tilted up position and belt 12 not running, an operator places another hide on belt 12.

Figure 5:
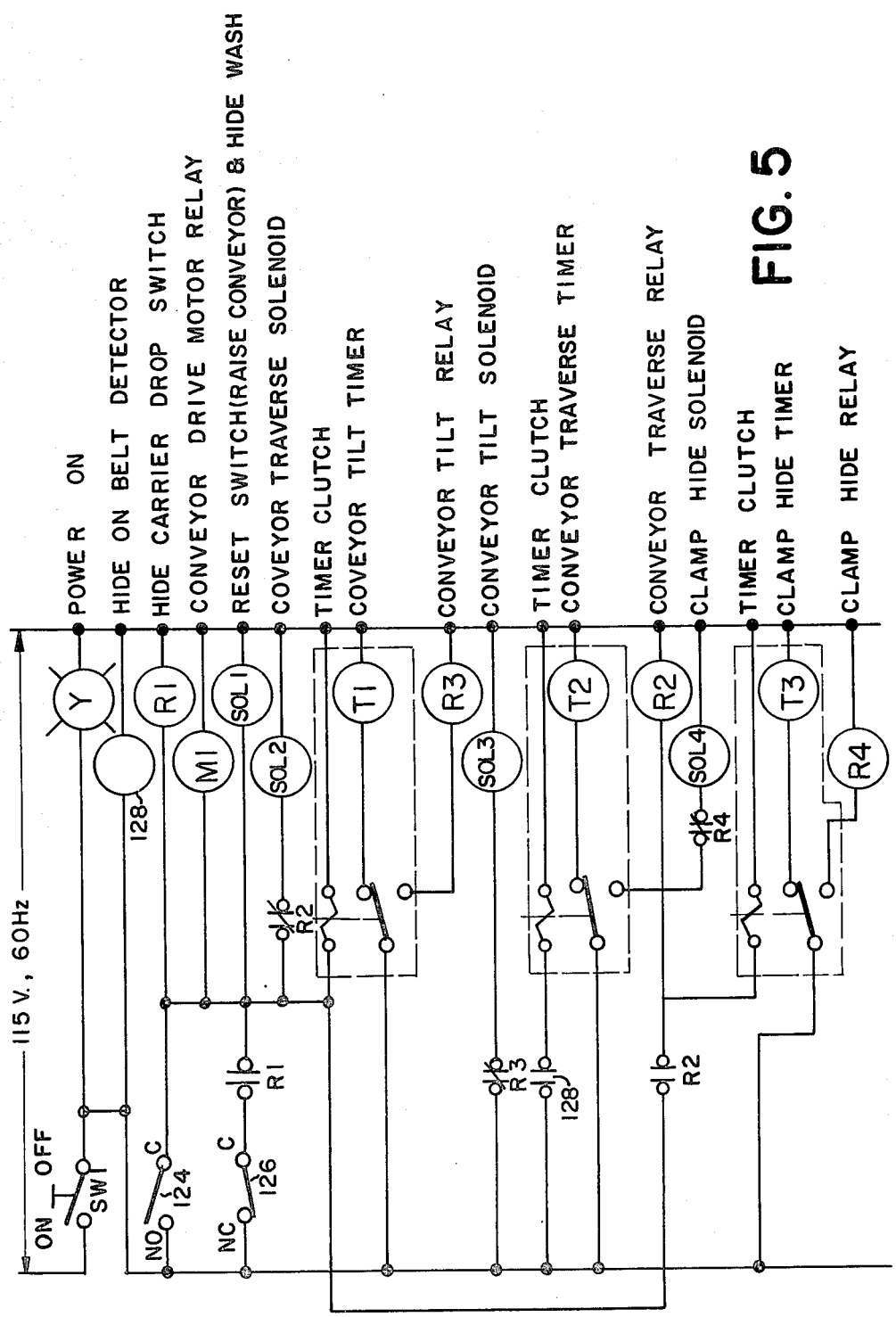
FIG. 5 is an electrical schematic.
Figure 6:
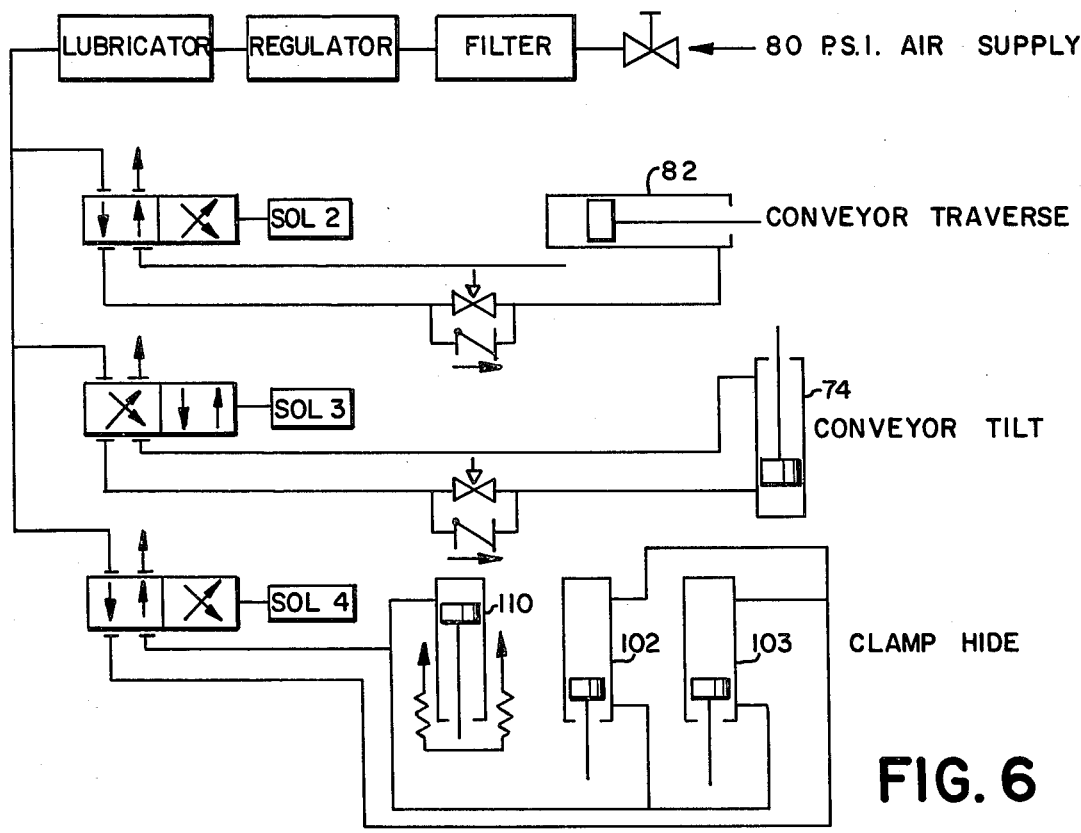
FIG. 6 is a pneumatic diagram.

Although operation of the apparatus of the invention has been described with reference to FIGS. 5 and 6, it is recognized that the electrical and pneumatic operation are conventional and are not considered to be part of the inventive concept.

Briefly, without reference to FIGS. 5 and 6, the apparatus operates in the following manner. Cylinder 74 is activated to raise mechanism 2 to the position shown in FIG. 1. A hide 48 is placed on belt 12. Motor 22 starts operating, belt 12 begins moving, water spray 44 starts spraying water on hide 48. Cylinder 82 is activated and mechanism 2 moves forward to the position shown in FIG. 2. The leading edge of hide 48 passes under photoelectric unit 128 which automatically sets a timer in operation to allow about one-half of hide 48 to be draped over bar 134 before mechanism 2 traverses back to the position shown in FIG. 1. Cylinders 102, 103 and 110 have also been activated and clamp hide 48 so that it cannot slide off bar 134. As mechanism 2 traverses back the second half of hide 48 is draped over bar 134 and immersed in solution 154 in vat 156. Cylinder 74 then retracts and lowers mechanism 2 to the position shown in FIG. 4 thereby releasing bar 134 from hooks 52.

Figure 2:
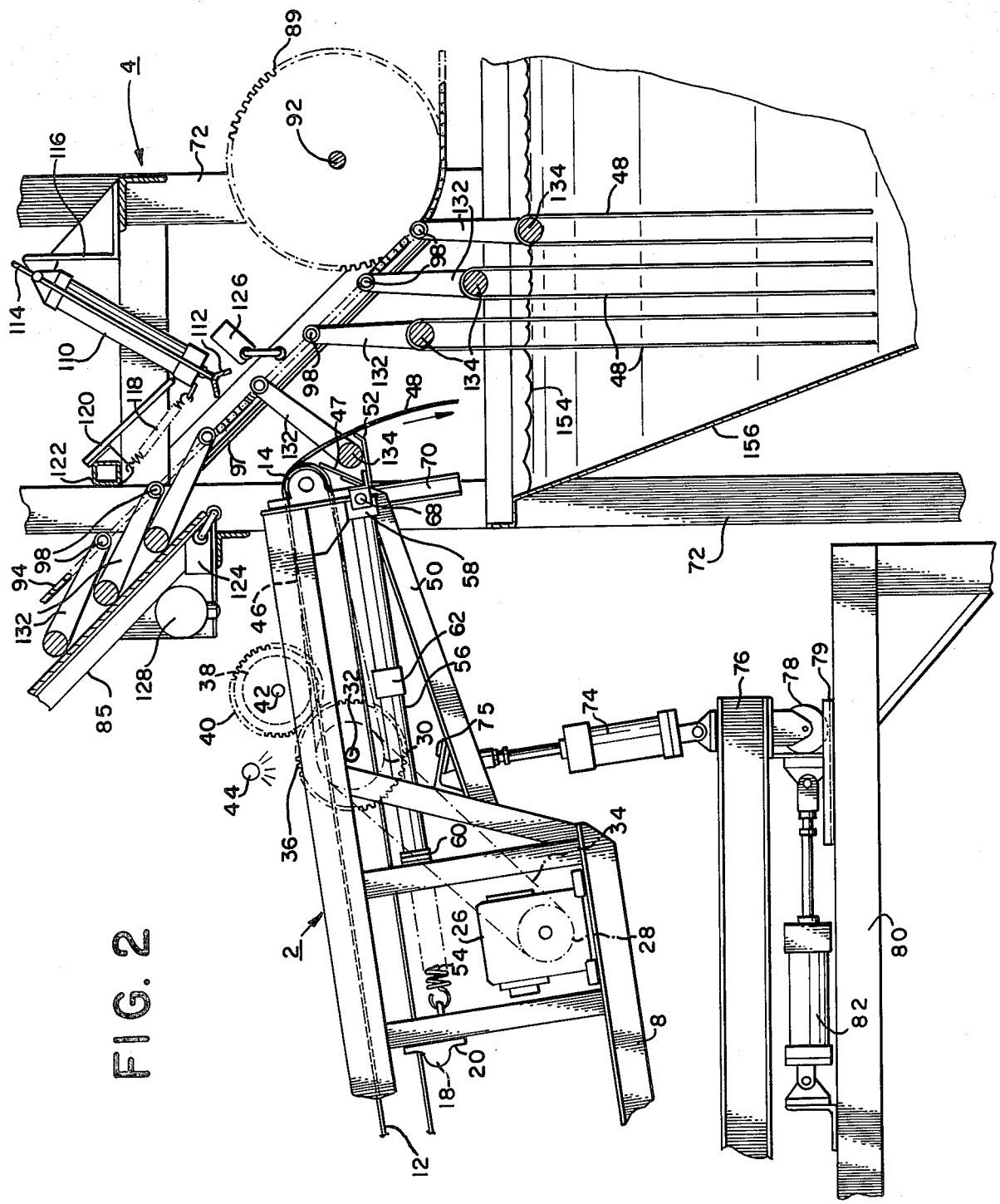
FIG. 2 is a side elevation of the apparatus showing feed conveyor mechanism after it has traversed forward.

Hide carrier bar 134 which is part of hide carrier and clamping mechanism 6 is brought into position to receive a hide by mechanism 4. Rod 98 of mechanism 6 is pivotally attached to a link of chains 94 and 96 thereby providing the means for transporting mechanism 6 into position to receive a hide. When about half the length of a hide has been run over bar 134 as shown in FIGS. 2 and 3, cylinders 102, 103 and 110 are activated. Cylinders 102 and 103 actuate toggle lock clamps 136 to close and cylinder 110 opens and clamps hide 48 to bar 134 as shown in FIG. 3. Mechanism 2 is then retracted allowing the remaining half of hide 48 to be draped over bar 134 and then mechanism 2 is lowered and bar 134 released from hooks 52 allowing mechanism 6 to swing freely. This part of the operation, the loading of a hide on a carrier bar automatically and in such a fashion that the approximate center of the lengthwise dimension of the hide is resting on the carrier bar and the remainder of the hide draped about evenly lengthwise in each side of the bar, is the purpose for which the apparatus was invented.

I claim:

1. An apparatus for loading cattlehides and other like materials onto carrier bars, comprising a multiplicity of carrier and clamping means, each of which has a pair of locking clamps and a carrier bar, processing means for transporting said carrier and clamp means, for actuating the locking clamps, and for clamping a hide to a carrier bar, and means for conveying a hide to be loaded onto a carrier bar and for holding a carrier bar in position to be loaded, said conveying means having means for traverse movement and for being raised and lowered so that when the conveying means is in a forward position about one-half of the hide is run-in over the carrier bar and when the conveying means moves to a rearward position the rest of the hide is draped over the bar and the conveying means is then lowered to release the carrier bar, said apparatus being provided with means for coordinating the action of the carrier and clamping means with the processing and conveying means.

2. An apparatus for loading cattlehides and other like materials onto carrier bars, comprising:

(a) a multiplicity of hide carrier and clamping means, each having a carrier bar and a pair of toggle lock clamps for holding a hide on said bar;
(b) a process conveyor means for transporting the hide carrier and clamping means, said process conveyor means having means for actuating the aforesaid toggle lock clamps and means for clamping a hide to a carrier bar; and
(c) a feed conveyor means for conveying a hide to a hide carrier bar, said feed conveyor means having a pair of catch hooks for holding a carrier bar while a hide is draped over the bar and having means for traverse movement and for being raised and lowered so that after the hide is draped over the carrier bar the feed conveyor means can be lowered to release the carrier bar; said apparatus being provided with the means needed to coordinate the movements of the hide carrier and clamping means, the process conveyor means, and the feed conveyor means so that a hide can be loaded onto a carrier bar automatically.

3. An apparatus for loading cattlehides automatically onto carrier bars, comprising:

(a) a multiplicity of hide carrier and clamping means, each of which is provided with a rod attached to a hide carrier bar and a pair of toggle lock clamps for holding a hide on the carrier bar, each of said clamps being provided with an actuating means for locking and unlocking the clamps;
(b) a process conveyor means for transporting the hide carrier and clamping means said process conveyor means being provided with a hide carrier bar guide, a pair of chains the links of which serve as attachment links for pivotally attaching a rod of the hide carrier and clamping means, an air cylinder assembly on each side of the process conveyor means for actuating the toggle lock clamps, and an air cylinder with clamping angle for clamping a hide to a carrier bar at a predetermined stage of the loading operation and;
(c) a feed conveyor means having catch hooks for holding a carrier bar for loading and having a movable belt for transporting cattlehides to the carrier bar, said feed conveyor means having means for traverse movement to allow the hide to be draped over the carrier bar and having means for being raised and lowered so that after the hide is draped over the carrier bar the feed conveyor means can be lowered to release the carrier bar; said apparatus being provided with the electrical and pneumatic means for coordinating the operations of the hide carrier and clamping means, the process conveyor means, and the feed conveyor means with respect to each other so that the hides are loaded onto the carrier in such a manner that the approximate center of the lengthwise dimension of the hide is resting on the carrier bar.

* * * * *